United States Patent [19]

Gustafsson

[11] 3,986,664
[45] Oct. 19, 1976

[54] HEATING INSTALLATION COMPRISING A HEAT PUMP AND A FUEL-FIRED BOILER WITH A RADIATOR CIRCUIT

[75] Inventor: Berth Ulrik Gustafsson, Osterskar, Sweden

[73] Assignee: Projectus Industriprodukter AB, Stockholm, Sweden

[22] Filed: Apr. 10, 1975

[21] Appl. No.: 566,716

[30] Foreign Application Priority Data
Apr. 18, 1974 Sweden .............................. 7405257

[52] U.S. Cl. .................................. 237/2 B; 62/238
[51] Int. Cl.² ...................... F24D 3/00; F25B 29/00
[58] Field of Search ................... 62/196, 238, 226; 237/2 B, 59, 8 C, 8 R

[56] References Cited
UNITED STATES PATENTS

| | | | |
|---|---|---|---|
| 1,826,950 | 10/1931 | Paige | 237/8 R |
| 2,095,017 | 10/1937 | Wilkes et al. | 62/238 |
| 2,102,940 | 12/1937 | Buchanan | 62/238 |
| 2,191,623 | 2/1940 | Philipp | 62/226 X |
| 3,117,425 | 1/1964 | Hartwell | 62/196 |

Primary Examiner—William E. Wayner
Attorney, Agent, or Firm—Toren, McGeady and Stanger

[57] ABSTRACT

There is provided a heating installation comprising a heat pump and a fuel-fired boiler to which a radiator circuit is connected. A separate hot water heater may be coupled in parallel with the boiler. The hot side of the heat pump is connected to a first shunt pipe in the radiator circuit and is thus coupled in parallel with the boiler. A second shunt pipe is coupled in parallel with the boiler and a third shunt pipe is connected between the hot side of the first shunt pipe and the second shunt pipe. A first threeway shunt valve is connected between the first and third shunt pipes and a second threeway shunt valve is connected between the second shunt pipe and the hot side of the radiator circuit. These two shunt valves may be interlocked.

Further the compressor of the heat pump may be arranged to be controlled by the pressure of the refrigerant in the heat pump circuit between the evaporator and the compressor.

5 Claims, 1 Drawing Figure

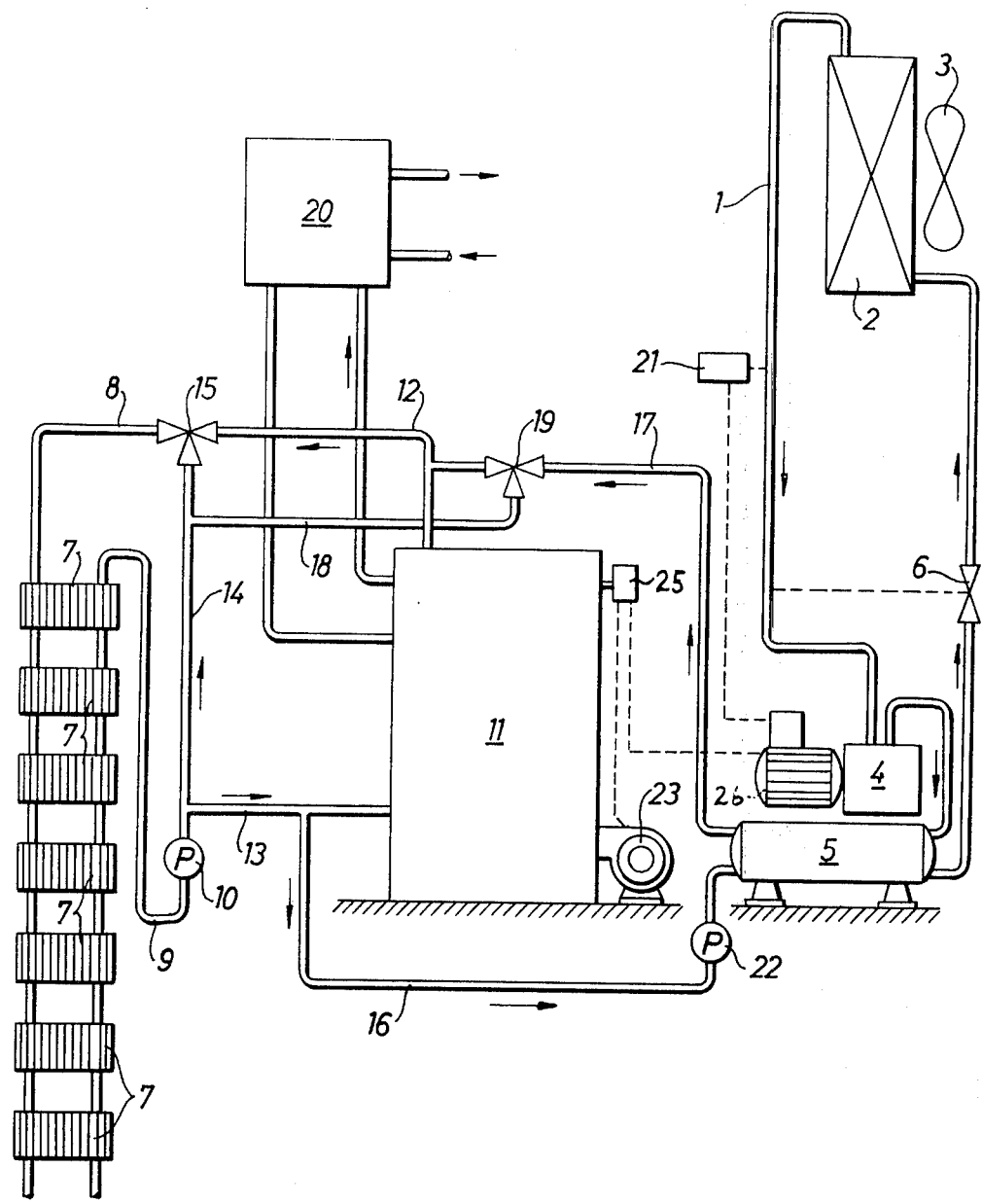

HEATING INSTALLATION COMPRISING A HEAT PUMP AND A FUEL-FIRED BOILER WITH A RADIATOR CIRCUIT

The present invention relates to a heating installation comprising a conventional fuel-fired boiler and to which a radiator circuit and a water heater are connected, complete with a heat pump comprising a refrigerant circuit and, in series therein, a refrigerant expansion valve, and evaporator, a compressor and a condenser designed as a heat-exchanger in order to transfer the heat of the refrigerant circuit to the radiator circuit. For space-heating and water-heating applications, it is already known to utilise heat pumps and, where the external temperatures are low, some kind of auxiliary heat source. By way of auxiliary heat source, in a few isolated instances conventional oil-fired boilers have been used.

However, it has been found that the combination of heat pump and series-connected oil-fired boiler, gives rise to unfavourable conditions from the control point of view and this may be one of the reasons why, hitherto, more often than not it has been chosen to utilise electrical heating or external heating, as a complement to the heat pump, despite the fact that these energy forms are expensive and unsuitable from the point of view of the power producer and distributor.

A characteristic of the heat pump is that making the proviso of a constant condensation temperature on the part of the refrigerant, it exhibits a steeply decreasing "heat development capability", i.e. the ratio between the output and input energies, with decreasing external air temperature. Moreover, to a certain extent the heat requirement of a building increases with decreasing external temperaure. In addition, it is uneconomical to design a heat pump to cover the total heat requirement of a property, on the coldest day of the year. Normally, between 30 and 40% of the heat requirement is covered by the heat pump whilst any additional heat requirement is met by the use of some other heat source. If an external heat source or electrical heating is used as the additional heat source, then this will have a low power consumption with high external air temperatures and a high power consumption with low external air temperatures. This, taken together with other associated effects, is highly unfavourable from the production point of view since many large power production plants can only with difficulty be contrived to produce the power output corresponding to the kind of increased demand generated by low outside temperature.

One object of the invention is to provide a heating installation the construction of which yields such favourable conditions from the control point of view that special adaptations between heat pump and fuel-fired boiler can be dispensed with, and so that simple control devices can be used in order to control the heat distribution between the pump and the boiler in a situation where the heat pump capacity is insufficient to meet the heat requirement of the property. Another object of the invention is to demonstrate a method of building a heating installation in accordance with the invention, by the addition to an existing, conventional fuel-fired water heating system, of a heat pump, this in such a fashion that complicated control systems and adaptations can be avoided.

A further object of the invention is to provide a heating installation which is such as to prevent the power production network from being loaded under extreme weather conditions.

The installation in accordance with the invention is specially designed for multi-family dwellings, industrial working spaces, offices and the like, in which the power requirement exceeds around 10 kW.

An installation of the type introductorily described, is distinguished in accordance with the invention by the fact that the condenser heat-exchanger is connected in parallel with the boiler, and that it is arranged for the compressor to be controlled through the agency of the pressure in the refrigerant circuit, between compressor and evaporator. The method proposed in accordance with the invention, for the addition to an existing oil-fired heating installation, of a heat pump, is distinguished by the fact that the heat pump is connected in parallel with the oil-fired boiler, and that the heat pump compressor is controlled in accordance with the pressure in the low-pressure side of the refrigerant circuit.

The installation comprises preferably a large oil-fired boiler with a separate hot water heater.

A preferred embodiment of this kind of installation, in which a main controllable shunt valve is arranged in the riser line of the radiator circuit and in which a shunt line is arranged between the main shunt valve and the return line of the radiator circuit, is characterised in that the other shunt valve is arranged at the discharge side of the condensor heat-exchanger, said latter valve being designed to be capable of directing the flow leaving the heat exchanger, into the shunt line. This is a simple method of controlling the energy flow from the heat pump to the oil-fired boiler or hot water heater, and the riser line of the radiator circuit. Both main shunt valves and the other shunt valve can be of automatic design, i.e. can be arranged so that they shunt the hot water depending upon the desired temperature. Self-evidently, both these valves can equally well be simple manually operated shunts but in order to some extent to facilitate the adjustment of the heat flow for a given demand, these two shunts can be connected to one another for example by a mechanical lost-motion link so that a certain adjustment of the other shunt does not initially affect the adjustment of the main shunt.

The heat pump compressor will preferably be of the multicylinder kind which can be shut down or cut in in correspondance with the varying heat demand of the property. The shutting down or cutting in of the compressor can be arranged to be controlled by the boiler water temperature. The invention will now be described in more detail making reference to the attached drawing which schematically illustrates an installation in accordance with the invention.

At the right-hand side of the drawing there can be seen a closed circuit 1 for a refrigerant, for example Freon. The circuit 1 comprises in series an evaporator assembly 2 which is assigned a fan 3 in order to increase the air throughput, a compressor 4, a condensor 5 and an expansion valve 6. The refrigerant flows through the circuit, undergoing compression in the compressor 4, condensation in the heat exchanger 5, expansion in the expansion valve 6 and evaporation in the evaporator 2. The condensor is designed as a heat exchanger in order to transfer the heat content of the refrigerant to the water flowing through the radiator and boiler system. The radiators 7 are connected to a riser line 8 and a return line 9. A pump 10 is arranged in the return line 9 in order to improve the circulation through the radiators 7. The riser line 8 and the return line 9 are connected to an oil-fired boiler 11 via a feed line 12 and a return line 13. A shunt line 14 is arranged between the return line 9 and the riser line 8. A shunt 15 is connected to the riser line 8, the feed line 12 and the shunt line 14. The heat pump 1 to 6 is connected, by piping 16 and 17, to return line 13 and feed line 12 so that the heat exchanger 5 is effectively placed in parallel with the oil-fired boiler 11. A pipe 18 extends between the shunt line 14 and the pipe 17. The line 18 is connected to the pipe 17 via another shunt valve 19 with the help of which the heat exchanger flow can be distributed in the manner which will be evident from the drawing. A separate hot water heater 20 of conventional kind is connected to the oil-fired boiler 11 in the normal way. Alternatively, the hot water heater can be connected in parallel with the boiler 11.

If we now consider the typical control system which is used to match the heat pump to the oil-fired boiler, then it will be seen that the heat pump comprises a detector element 21 which measures the refrigerant pressure between the evaporator and the compressor. The compressor 4, conveniently of multi-cylinder design, is arranged so that one or more pistons can be stopped or coupled in, all in accordance with the existing heat demand. The pressure device 21 is arranged to select the number of cylinders of the compressor 4, which are coupled in. By detecting the refrigerant vacuum level following the evaporator, an indication of the gas density and therefore of the external temperature is obtained, and this controls the operation of the heat pump. In addition, the compressor 4 can be arranged to be shut down or cut in in accordance with the boiler water temperature. Thus, the thermostat 25 which senses the hotwater temperature of the system and which controls the operation of the oil-burner 23 can be arranged also to control the stopping of the compressor motor 26. The expansion valve 6 can be controlled in the usual way in accordance with the refrigerant pressure after the evaporator.

The installation shown in the drawing thus comprises a circuit incorporating the oil-fired boiler 11, the pipes 12, 8, the radiators 7, the pipe 9, the pump 10 and the pipe 13. In this circuit, the condenser heat-exchanger 5, is connected in parallel with the oil-fired boiler 11.

In order as far as possible to optimise the system in relation to the standard pipe strength limits, preferentially a pressure limit of 24 atmospheres absolute will be chosen. If a heat pump contains Freon 22, then a water temperature of 55° C is obtained. In summer-time operation, the boiler temperature will then conveniently be set to a maximum of 55° C so that the oil-fired boiler does not normally have to switch in in summer-time. In this case, the shunt 19 will be adjusted so that the flow through the condensor heat-exchanger is delivered in its entirety to the feed line 12 whence the water, heated by the heat pump, flows through the oil-fired boiler and via the pipes 13, 16 back to the condensor unit 3, 5 under the control of the feed pump 22. This circulation presumes that the shunt 15 in the riser line is closing off the feed line 12.

If it is now assumed that hot water is required to be supplied to the radiators, then the controllable shunt 15 will be set to a suitable flow value or the sunt adjusted to give a suitable riser line temperature, and part of the heat exchanger flow is tapped off to the shunt line 15 by means of the shunt 19. Consequently the said flow through the boiler reduces with the consequent risk that the water in the hot water heater will not reach a sufficiently high temperature for example after a heavy withdrawal from the system. This means that the boiler water temperature drops and this, when the heat pump is operating at maximum capacity, means that the burner unit 23 will cut in under the control of the control device normally provided for that purpose. Consequently, hot water flows from the boiler to the feed line 12 and on to the controllable shunt which, via the branch line 18 and the shunt line 14, is supplied with the heat exchanger water so that the riser line 8, due to the mixing taking place from the two lines arriving at the shunt, can be supplied with water at the correct temperature. Under this circumstance, the flow direction through the oil-fired boiler changes in relation to the summer-time situation described earlier. In winter-time, thus, the water heated in the heat exchanger 5 flows through the line 17, the line 18 and the shunt line 14 to the riser line shunt, whilst the water heated in the boiler 11 flows through the line 12 to the controllable shunt. The controllable shunt can then be adjusted to give the proper riser line temperature. The water from the heat exchanger, which is not introduced into the riser line, flows down through the shunt line and through the return line 13 to the boiler and to the line 16 for recirculation through the heat exchanger. In this fashion, an extremely wide degree of flexibility in terms of the compatibility between the two heat sources, is achieved. Both shunts, 15 and 19, may be automatic or simply of the temperature responsive kind.

What is claimed is:

1. A heating installation comprising a conventional fuel-fired boiler, a radiator circuit connected to said fuel-fired boiler and comprising at least one radiator, means connecting said radiator to said boiler including a riser line and a return line, a water heater connected to said boiler, and a heat pump comprising a refrigerant circuit including a refrigerant expansion valve, an evaporator, a compressor and a condensor heat-exchanger arranged in series within said circuit, wherein the improvement comprises that said condensor heat exchanger is connected to said radiator circuit in parallel with said boiler, means located between said compressor and said evaporator in said refrigerant circuit for controlling said compressor in accordance with the pressure of the refrigerant in said refrigerant circuit, a main shunt valve located in said riser line, a shunt line interconnecting said main shunt valve and said return line, an output pipe connected between said condensor heat exchanger and said radiator circuit for supplying heating fluid from said condensor heat exchanger to said radiator circuit, a second shunt valve positioned to said output pipe, and pipe means connected to said second shunt valve and said shunt line for directing heating fluid flow from said condensor heat exchanger into said shunt line.

2. A heating installation, as set forth in claim 1, including a compressor motor for driving said compressor, and said means for controlling said compressor arranged in operative connection to said compressor motor for controlling the r.p.m. of said compressor in accordance with the lowest refrigerant pressure.

3. A heating installation, as set forth in claim 2, wherein a control member is arranged to sense the heating fluid temperature in said boiler and is disposed in operative connection to said compressor motor for shutting down or cutting in said compressor in accordance with the heating fluid temperature in said boiler.

4. A method of incorporating a heat pump comprising a refrigerant circuit with an expansion valve for the refrigerant, an evaporator, a compressor and a condensor arranged in series in the refrigerant circuit, into a heating installation including a conventional fuel-fired boiler, a radiator circuit connected to the boiler and comprising at least one radiator and conduit means for supplying heating fluid to and removing it from the radiator including a riser line and a return line, and a hot water boiler connected to said fuel-fired boiler, wherein the improvement comprises positioning the condensor in the refrigerant circuit in heat-exchange relation with the radiator circuit and in parallel with the boiler for transferring refrigerant circuit heat to the heating fluid in the radiator circuit, and detecting the pressure of the refrigerant in the refrigerant circuit between the evaporator and the compressor and based on the pressure detected controlling the operation of the compressor.

5. A method, as set forth in claim 4, including controlling the flow of the heating fluid into the riser line in the radiator circuit and controlling the flow of the heating fluid between the condensor heat-exchanger and the radiator circuit for providing regulation of the temperature of the heating fluid flowing into the riser line of the radiator circuit.

* * * * *